ID1195312B1

United States Patent
Kim et al.

(10) Patent No.: US 10,095,312 B1
(45) Date of Patent: Oct. 9, 2018

(54) SYSTEM AND METHOD FOR GENERATING EMS SIGNAL

(71) Applicants: Ho Bin Kim, Anyang-si (KR); Won Seok Choi, Seoul (KR); Jong Bin Kim, Seoul (KR)

(72) Inventors: Ho Bin Kim, Anyang-si (KR); Won Seok Choi, Seoul (KR); Jong Bin Kim, Seoul (KR)

( * ) Notice: Subject to any disclaimer, the term of this patent is extended or adjusted under 35 U.S.C. 154(b) by 0 days.

(21) Appl. No.: 15/719,895

(22) Filed: Sep. 29, 2017

(30) Foreign Application Priority Data

Jul. 6, 2017 (KR) .................. 10-2017-0085987

(51) Int. Cl.
*G06F 3/01* (2006.01)
*G06T 19/00* (2011.01)

(52) U.S. Cl.
CPC .............. *G06F 3/016* (2013.01); *G06F 3/017* (2013.01); *G06T 19/006* (2013.01)

(58) Field of Classification Search
CPC ........ G06F 3/016; G06F 3/017; G06T 19/006
See application file for complete search history.

(56) References Cited

U.S. PATENT DOCUMENTS

| 2016/0091980 | A1* | 3/2016 | Baranski | A61B 5/0488 345/156 |
| 2016/0166930 | A1* | 6/2016 | Brav | F41A 33/00 463/30 |
| 2016/0184703 | A1* | 6/2016 | Brav | G06F 3/012 463/30 |
| 2016/0189493 | A1* | 6/2016 | Rihn | G08B 6/00 340/407.1 |

FOREIGN PATENT DOCUMENTS

KR 10-2017-0013653 A 2/2017

* cited by examiner

*Primary Examiner* — Dmitriy Bolotin
(74) *Attorney, Agent, or Firm* — Studebaker & Brackett PC (57) ABSTRACT

Embodiments of the inventive concept relate to a system and a method for generating an electrical muscle stimulation (EMS) signal, and more particularly to a system and a method for generating an EMS signal, by which a user may be allowed to realistically experience a virtual reality by outputting an EMS signal according to a motion of the body of the user, information on the virtual reality, and the like and applying an electrical stimulus to a muscle of the user. Disclosed is a system for generating an EMS signal, the system including a sensing device configured to acquire body information of a user, a calculation device configured to store virtual reality information, and to calculate an EMS signal value based on the user body information and the virtual reality information, and an EMS output device configured to output an EMS signal based on the EMS signal value.

11 Claims, 9 Drawing Sheets

SYSTEM AND METHOD FOR GENERATING EMS SIGNAL

CROSS-REFERENCE TO RELATED APPLICATIONS

A claim for priority under 35 U.S.C. § 119 is made to Korean Patent Application No. 10-2017-0085987 filed on Jul. 6, 2017 in the Korean Intellectual Property Office, the entire contents of which are hereby incorporated by reference.

BACKGROUND

Embodiments of the inventive concept relate to a system and a method for generating an electrical muscle stimulation (EMS) signal, and more particularly to a system and a method for generating an EMS signal, by which a user may be allowed to realistically experience a virtual reality by outputting an EMS signal according to a motion of the body of the user, information on the virtual reality, and the like and applying an electrical stimulus to a muscle of the user.

In recent years, various image technologies have been developed and applied due to the remarkable development of the image field, and in particular, the technologies of generating a virtual reality image and reproducing the generated virtual reality image through a user terminal, such as a computer, to allow the user to watch the virtual reality image have appeared.

Here, a virtual reality (VR) refers to a simulation technology that allows the user to experience an environment that is not an actual reality but is similar to an actual reality through a three-dimensional sight, and the virtual reality has a feature of providing the user with an additional experience or information that cannot be obtained from the reality world only based on a virtual space and thing.

However, according to a conventional technology (Korean Patent Application Publication No. 10-2017-0013653), the experiences of the virtual reality are limited to virtual and audible stimuli so that there is a limit in giving a high level field feeling to the user.

Accordingly, a method for solving the problem has been required.

Meanwhile, the above-mentioned background technology has been owned by the inventor for deriving the inventive concept, or is technology information acquired in a process of deriving the inventive concept, and thus it cannot be said that the background technology has been opened to the public before the filing date of the inventive concept.

SUMMARY

Embodiments of the inventive concept provide a system and a method for generating an electrical muscle stimulation (EMS) signal.

Embodiments of the inventive concept also allow a user to experience a virtual reality with a character in a virtual space in real time by applying an electrical stimulus based on an EMS signal to a muscle of the user.

Embodiments of the inventive concept also provide an experience of a more realistic virtual reality by outputting an EMS signal according to a motion of the body of a user, information on the virtual reality, and the like and applying an electrical stimulus to a muscle of the user to allow the user to feel a mechanical interaction with a virtual space or a virtual object.

Embodiments of the inventive concept also apply a load to a targeted muscle, which is to be operated, by applying an electrical stimulus to the targeted muscle.

Embodiments of the inventive concept also minimize unnaturalness due to a time difference between an operation of an actual user and a virtual reality.

Embodiments of the inventive concept also provide various experiences such as a game and an education to a user by providing an experience of a realistic virtual reality.

In accordance with an aspect of the inventive concept, there is provided a system for generating an EMS signal, the system including a sensing device configured to acquire body information of a user, a calculation device configured to store virtual reality information, and to calculate an EMS signal value based on the user body information and the virtual reality information, and an EMS output device configured to output an EMS signal based on the EMS signal value.

In accordance with another aspect of the inventive concept, there is provided a method for generating an EMS signal, the method being performed by the EMS signal generating system, the method including acquiring virtual reality information, acquiring body information of a user, calculating an EMS signal value based on the virtual reality information and the body information of the user, and outputting an EMS signal based on the signal value.

In accordance with another aspect of the inventive concept, there is provided a computer-readable recording medium in which a program that performs an EMS signal generating method is recorded. Then, the EMS signal generating method includes acquiring virtual reality information, acquiring body information of a user, calculating an EMS signal value based on the virtual reality information and the body information of the user, and outputting an EMS signal based on the signal value.

In accordance with another aspect of the inventive concept, there is provided a computer program stored in a medium to perform an EMS signal generating method, the computer program being performed by an EMS signal generating system. Then, the EMS signal generating method includes acquiring virtual reality information, acquiring body information of a user, calculating an EMS signal value based on the virtual reality information and the body information of the user, and outputting an EMS signal based on the signal value.

According to any one of the above-mentioned solutions, embodiments of the inventive concept may provide a system and a method for generating an EMS signal.

Embodiments of the inventive concept also may allow a user to experience a virtual reality with a character in a virtual space in real time by applying an electrical stimulus based on an EMS signal to a muscle of the user.

Embodiments of the inventive concept also may provide an experience of a more realistic virtual reality by outputting an EMS signal according to a motion of the body of a user, information on the virtual reality, and the like and applying an electrical stimulus to a muscle of the user to allow the user to feel a mechanical interaction with a virtual space or a virtual object.

Embodiments of the inventive concept also may apply a load to a targeted muscle, which is to be operated, by applying an electrical stimulus to the targeted muscle.

Embodiments of the inventive concept also may minimize unnaturalness due to a time difference between an operation of an actual user and a virtual reality.

Embodiments of the inventive concept also may provide various experiences such as a game and an education to a user by providing an experience of a realistic virtual reality.

The effects that may be obtained from the disclosed embodiments are not limited to the above-mentioned effects, and that other unmentioned effects will be clearly understood by an ordinary person in the art to which the embodiments pertain.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, various embodiments of the inventive concept will be described in detail with reference to the accompanying drawings. The embodiments below may be modified into various different forms to be carried out. In order to describe the features of the embodiments more clearly, a description of the items that are widely known to an ordinary person skilled in the art to which the inventive concept pertains will be omitted. Further, parts that are irrelevant to the description are excluded from the drawings and the similar parts are denoted by similar reference numerals throughout the specification.

Throughout the specification, when it is described that a component is "connected" to another component, it means not only that they are 'directly connected' to each other but also that they 'are connected to each other while another component is interposed therebetween'. Further, when it is described that a component "comprises" another component, it means that other components are not excluded but may be further comprised unless particularly contradictorily described.

Hereinafter, embodiments of the inventive concept will be described with reference to the accompanying drawings.

Figure 1:
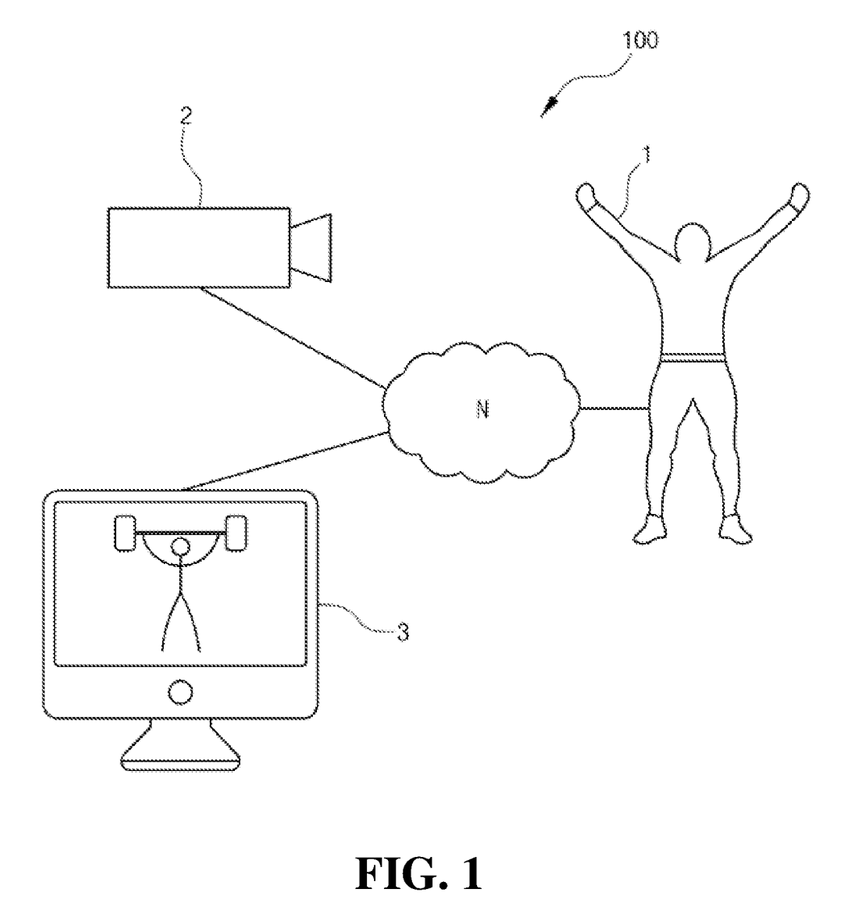
FIG. 1 is a diagram illustrating a schematic configuration of an electrical muscle stimulation (EMS) signal generating system according to an embodiment.

FIG. 1 is a diagram illustrating a schematic configuration of an electrical muscle stimulation (EMS) signal generating system according to an embodiment.

According to an embodiment, the EMS signal generating system 100 is a system that may allow a user to experience a virtual reality by applying an electrical stimulus to a muscle of the user, and may include an EMS output device 1, a sensing device 2, and a calculation device 3 and the configurations of the EMS signal generating system 100 may communicate with each other by using a network. Further, the EMS signal generating system 100 may include an audio-visual output device that outputs an audio-visual material for a virtual reality, and according to an embodiment, the audio-visual output device may be included in the calculation device 3.

Then, the network may be realized by all types of wired/wireless networks, such as a local area network (LAN), a wide area network (WAN), a value added network (VAN), a personal area network (PAN), a mobile radio communication network, wireless broadband internet (Wibro), mobile WiMAX, high speed downlink packet access (HSDPA), and a satellite communication network.

First, the EMS signal generating system 100 may include an EMS output device 1 mounted on the body of a user to generate an electrical stimulus.

Here, an 'electrical muscle stimulation (EMS)' means that contraction of a muscle is artificially derived through an electrical signal. In the following embodiment, the EMS signal generating system 100 may allow a user to experience a mechanical interaction of a virtual reality, such as the gravity in a virtual space or an interaction with a virtual object, by applying an EMS signal to the body of the user.

Figure 2:
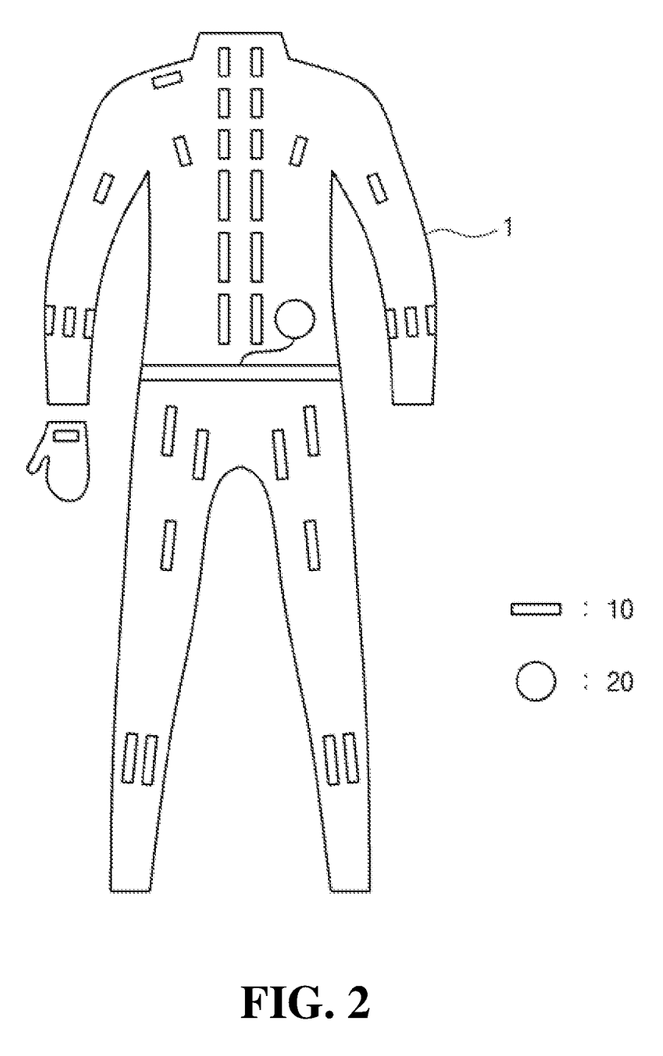
FIGS. 2 and 3 are exemplary views illustrating an embodiment of one configuration of the EMS signal generating system.

Here, referring to FIG. 2, an embodiment of the EMS output device 1 is illustrated. The EMS output device 1 may include a top, bottoms, gloves, which may be mounted on the body of the user, and according to an embodiment, may include socks and a helmet. Further, the EMS output device 1 may be realized in a form in which two or more of a top, bottoms, gloves, socks, and a helmet are connected to each other. For example, the EMS output device 1 may be realized in a form of a suit in which a top and bottoms are connected to each other.

According to an embodiment, the EMS output device 1 may include one or more electrodes 10 for applying an electrical stimulus to a muscle of the user. Then, the electrodes 10 may be arranged such that electrical stimuli may be applied to respective muscles distributed in the body of the user.

Figure 3:
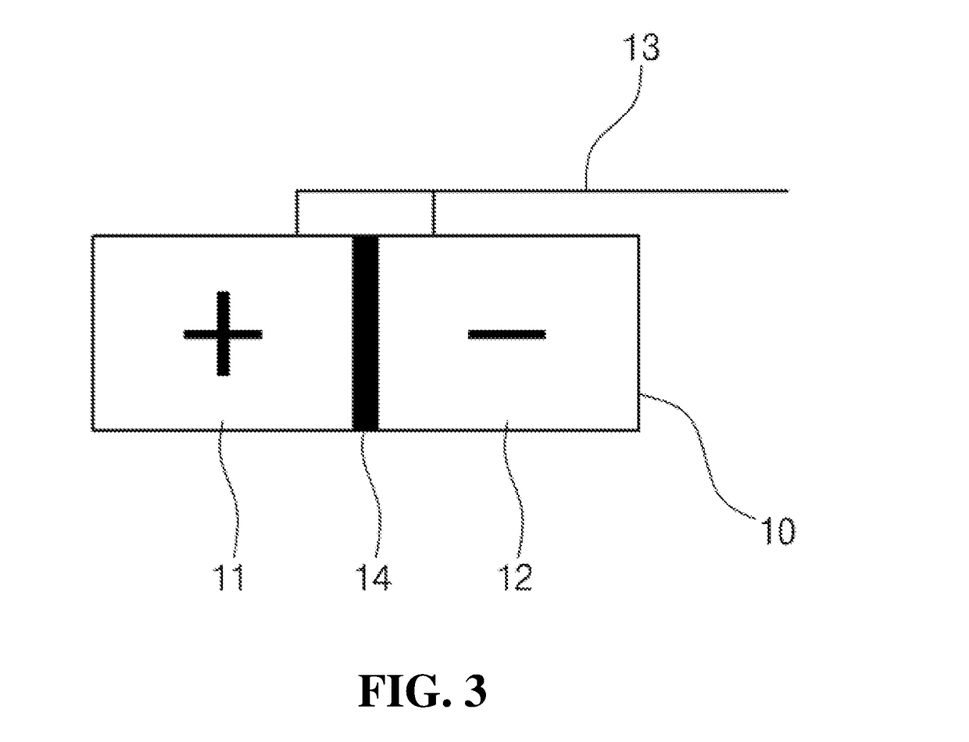

Here, referring to FIG. 3, an embodiment of the electrodes 10 attached to the EMS output device 1 is illustrated. The electrodes 10 according to the embodiment may include a positive electrode 11, a negative electrode 12, and an electric wire 13, and may include an insulator 14 for separating the positive electrode and the negative electrode.

Further, according to an embodiment, the EMS output device 1 may include an EMS module 20 for driving the EMS output device 1. Then, the EMS module 20 may include a battery for supplying electric power to the EMS output device, for example, including the electrodes 10. Further, the EMS module 20 may include a processor for controlling the electrodes 10, and may include a communication module for receiving an EMS signal value from the calculation device 3. The EMS module 20 of the EMS output device 1 may be disposed in a circuit including an arduino.

Further, according to an embodiment, the EMS output device 1 may include a sensing device 2 for acquiring various body information of the user. Then, "the body information of the user' is various pieces of information on the body of the user, and for example, may include at least one of a cardiogram of the user, a posture, a location, and a motion of the user. To achieve this, the sensing device 2 may include at least one of a cardiogram sensor, a motion sensor, and a visual sensor.

According to an embodiment, the cardiogram sensor may be mounted on the body of the user to detect an electrical signal generated by an activity of a heart. The information acquired by the cardiogram sensor may be utilized for recognizing physical and psychological states of the user.

Further, according to an embodiment, the motion sensor may be mounted on the body of the user to acquire body information of the user including at least one of a posture, a location, and a motion of the user. Then, the motion may include at least one of information on a direction and a speed of the motion.

Then, the motion sensor may be realized by a 9-axis sensor. According to an embodiment, the 9-axis sensor may include a 3-axis gyro sensor, a 3-axis acceleration sensor, and a 3-axis electronic compass. Further, according to an embodiment, the 9-axis sensor may obtain a forward/rearward movement, an upward/downward movement, a leftward/rightward movement, yawing, pitching, rolling, and a geomagnetic value of the body of the user according to the motion of the user. One or more motion sensors may be included in a top, bottoms, gloves, and the like of the above-mentioned EMS output device 1, and may be distributed at respective body portions to be arranged such that the body information of the user may be properly collected.

Further, according to an embodiment, the visual sensor may be realized by one or more, for example, a pair of cameras. Then, the pair of cameras may be installed to be spaced apart from each other to acquire image data, by which a posture, a location, and a motion of the user may be solidly analyzed. Further, the visual sensor may be realized by a depth camera that photographs a three-dimensional depth image to acquire a three-dimensional depth image obtained by photographing the body of the user.

As mentioned above, the visual sensor may photograph the body of the user to acquire image data. Then, the visual sensor may analyze image data obtained by photographing the body of the user to acquire body information of the user, including at least one of a posture, a location, and a motion of the user. Further, the visual sensor may transmit the image data to the calculation device 3, which will be described below. Then, the calculation device 3 may acquire body information of the user, including at least one of the posture, the location, and the motion of the user. Further, the visual sensor may be installed to be spaced apart from the top, the bottoms, and the gloves of the EMS output device 1 to photograph the body of the user. Accordingly, information of the location of the user in a space may be analyzed from the body information of the user acquired through the visual sensor.

Meanwhile, the calculation device 3 may determine a muscle of the user, to which an EMS signal is to be applied, and may calculate 'an EMS signal value' that is an intensity of the EMS signal, which is to be applied to the determined muscle. According to an embodiment, the calculation device 3 may control the EMS signal applied to the user, by transmitting the EMS signal value to the EMS output device 1. The calculation device 3 may be realized by an electronic terminal, and may include a server.

Then, the electronic terminal may be realized by a computer, a portable terminal, a wearable device, which may include an interface that may interact with the user. Here, the computer may include, for example, a notebook, a desktop, and a laptop, on which a web browser is mounted, the portable terminal may be a wireless communication device that secures portability and mobility and may include all types of handheld based wireless communication devices, such as a personal communication system (PCS), a personal digital cellular (PDC) phone, a personal handy phone system (PHS), a personal digital assistant (PDA), a global system for mobile communications (GSM), a code division multiple access (CDMA)-2000, W-code division multiple access (W-CDMA), a wireless broadband internet (Wibro), a smartphone, and mobile worldwide interoperability for microwave access (WiMAX). Further, the television may include an internet protocol television (IPTV), an internet television (TV), a ground wave TV, and a cable TV. Further, the wearable device is an information processing device that may be directly mounted on the body of a person, such as a watch, glasses, an accessory, clothes, and shoes, and may access a server of a remote site or be connected to another terminal via a network directly or through another information processing device. Further, according to an embodiment, when the calculation device 3 is realized by a wearable device, it may be attached to the EMS output device 1 to be mounted on the user.

Figure 4:
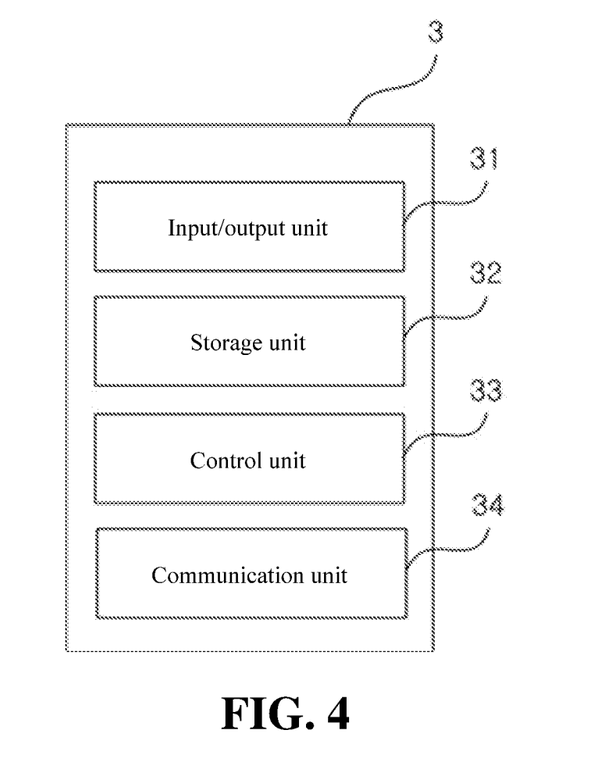
FIG. 4 is a block diagram illustrating one configuration of the EMS signal generating system.

Further, referring to FIG. 4, the calculation device 3 may include an input/output unit 31, a storage unit 32, a communication unit 34, and a control unit 33.

First, the input/output unit 31 may include an input unit for receiving an input of a user to drive the EMS signal generating system 100, and an output unit for outputting data on a virtual reality realized in an EMS signal generating process. For example, the input/output unit 31 may include an operation panel for receiving an input of the user, and a display panel for displaying a screen.

In detail, the input unit may include devices, such as a keyboard, a physical button, a touchscreen, a camera, and a microphone, which may receive various forms of inputs of the user. Further, the output unit may include a display panel, a speaker, and a head mounted display (HMD). According to an embodiment, the audio-visual output device that outputs an audio-visual material on a virtual reality may be included in the output unit of the calculation device 3 or may include an output unit.

Meanwhile, the storage unit 32 may store data for generating an EMS signal. For example, the storage unit 32 may store virtual reality information that is to be provided to the user.

Here, 'the virtual reality information' is information on a virtual reality that is to be provided to the user, and may include at least one of virtual space information, virtual object information, and character information corresponding to the user.

Then, 'the virtual space' is a virtual space that three-dimensionally realizes a virtual reality that is to be experienced by the user, and a character corresponding to the user and the like may be disposed in the virtual space. In this regard, the virtual space information is information on a virtual space environment, and may include information on parameters, such as particles floating on the virtual space and the gravity, which may mechanically interact with the character, as well as information that is to be audio-visually output to the user. For example, the virtual space information may include information on whether the virtual space is the underwater or the atmosphere, the characteristics of the atmosphere, and a direction and a magnitude of the gravity.

Further, 'the virtual object' refers to an object except for the character corresponding to the user, among virtual objects existing in the virtual space. For example, the virtual object may include a geographic feature disposed on the virtual space, equipment (a weapon mechanism, a defense mechanism, or an exercise mechanism) that may be mounted or used by the character. Further, the virtual object may mechanically interact with the character in the virtual space. Then, the virtual object information may include information on a shape, a location, a motion, and a weight of the virtual object.

Further, 'the character' is an object existing in the virtual space in correspondence to the user of the reality, and one or more characters may be provided according to an embodiment. According to an embodiment, the character may exist or move in the virtual space according to body information of the user, such as a location, a posture, a motion, and the like of the user, may be influenced by mechanical parameters of the virtual space based on the virtual space information, and may mechanically interact with the virtual object. In this regard, the character information may include a shape, a location, a posture, a weight, and the like of the character, and may include information on articles, such as belongings, accessories, and clothes of the character, which are carried by the character. Further, the character information may include information on the body of the character, such as an injury state, a health state, and a muscular force of the character.

One or more characters may be provided according to an embodiment, but one user, who is the center of the description is assumed for convenience' sake hereinafter. Accordingly, 'another character' corresponding to 'another user' is included in the virtual object that may mechanically interact with 'the character' corresponding to the user. However, the embodiments carried out in the specification may be applied to the second character in the same way as the character.

Here, the virtual space information, the virtual object information, or the character information may be set in advance and stored in the storage unit 32 or may be loaded from another server through the communication unit 34, but may be generated from information acquired through the sensing device 2 or may be generated through setting input from the input unit.

Meanwhile, the control unit 33 controls an overall operation of the calculation device 3 or the EMS signal generating system 100, and may include a processor such as a CPU. According to an embodiment, the control unit 33 may calculate an EMS signal value based on body information and virtual reality information of the user.

To achieve this, the control unit 33 may load virtual reality information including at least one of character information, virtual space information, and virtual object information, as mentioned above. That is, the control unit 33 may read virtual reality information stored in the storage unit 32 or may load virtual reality information from another server through the communication unit 34.

Further, the control unit 33 may check the sensing device 2. For example, the control unit 33 may calibrate the sensing device 2. According to an embodiment, the control unit 33 may measure a time delay caused by communication between two of the EMS output device 1, the sensor device 2, and the calculation device 3, and may calibrate data acquired from the sensing device 2 based on the measured time delay.

Further, the control unit 33 may periodically update the body information of the user when acquiring the body information of the user from the sensing device 2. Then, the update cycles of the motion sensor and the visual sensor may be differently set. For example, if the update cycle of the motion sensor is a first cycle and the update cycle of the visual sensor is a second cycle, the first cycle may be set to be shorter than the second cycle. For example, the update cycle of the 9-axis sensor included in the motion sensor may be set to 1/1200 seconds, and the update cycle of the visual sensor may be set to be 1/30 seconds. Through this, a difference between the time delays of the motion sensor and the time sensor may be overcome, and information may be efficiently acquired.

Further, the control unit 33 may analyze at least one of a posture, a location, and a motion of the user based on the body information of the user acquired from the sensing device 2. Then, the body information of the user may be calibrated in consideration of the above-mentioned time delay. For example, the posture, the location, and the motion of the user before the delayed time may be estimated in consideration of the time delay. Further, the control unit 33 may periodically update the posture, the location, and the motion of the user when the posture, the location, the motion, and the like of the user are analyzed. That is, information on the posture, the location, and the motion of the user may be changed by applying the body information of the user, which has been updated as described above.

According to an embodiment, the control unit 33 may league at least one of the posture, the location, and the motion of the user, which has been analyzed, with the character.

Then, the control unit 33 may calculate a mechanical interaction between at least one of the virtual space and the virtual object, and the character based on the virtual reality information and the body information of the user. For example, a mechanical feedback applied to the character may be calculated by applying an interaction with particles existing on the virtual space, an interaction with a virtual object occurring when the virtual object is raised or thrown, the gravity, and the like, which is generated when the character moves.

Further, the control unit 33 may determine a muscle, to which an EMS signal is to be applied, based on the calculated interaction, and may calculate an EMS signal value that is to be applied to the determined muscle.

That is, when a muscle to which a force of the user is to be applied is a target muscle and a muscle that acts in an opposite way to the target muscle is an objective muscle when an interaction is considered, the control unit 33 may calculate an EMS signal value that is to be applied to the objective muscle to allow the user to induce a force corresponding to the interaction to give the force to the target muscle, based on a mechanical interaction.

As a detailed embodiment, a force that is applied by a user at a moment when the user vertically strikes a log with an axe, an opposite force, and an objective muscle may be listed in a table as follows.

TABLE 1

| Description | Force applied | Opposite force | Objective muscle |
|---|---|---|---|
| 1 | a force by which a finger is gripped | a force by which a finger is unfolded | an extensor muscle of digits and an extensor pollicis longus |
| 2 | a force by which a wrist is bent downwards | a force by which a wrist is bent upwards | a brachioradialis and an extensor carpi radialis longus |
| 3 | a force by which an arm is unfolded straight | a force by which an arm is folded | a brachialis muscle and a biceps brachii |
| 4 | a force by which an arm and the shoulder is pulled toward the stomach | a force by which an arm and the shoulder are bent backwards | a supraspinatus and an infraspinatus |
| 5 | a force by which stomach and the chest are bent downwards | the a force by which the stomach and the chest are unfolded straight | an elector spinae |
| 6 | a force by which locations of the neck, the waist, and | — | — |

TABLE 1-continued

| Description | Force applied | Opposite force | Objective muscle |
|---|---|---|---|
| | a hip joint are maintained | | |
| 7 | a force by which the arms and the chest gather | a force by which arms gather on the side of the back | the a trapezius muscle |
| 8 | a force by which a knee is prevented from being bent | a force by which a knee is bent | a hamstring |
| 9 | a force of a toe (particularly, a bigtoe) by which a weight of the user is supported | | |

That is, an EMS signal value that has to be applied to the objective muscle that is applied for an operation that is opposite to the operation of the target muscle, to which a force of the user is to be applied, may be calculated based on information on an interaction between an axe and the character when the user vertically strikes a log with an axe, information on the weight of the axe and the like, and a posture, a motion, and the like of the user. By applying an EMS signal to the objective muscle according to the calculation value, the user may induce a force corresponding to the interaction to the target muscle and the user who applied a predetermined force to the target muscle feels as if he or she actually did the above-mentioned operation.

Further, the control unit 33 may generates and change virtual reality information based on virtual reality information, body information of the user, and the like. That is, information on changes of a posture, a location, and a motion of the character, and a change of a virtual space or a virtual object due to an interaction may be generated.

Further, the control unit 33 may generate audio-visual information based on virtual reality information. That is, the control unit 33 may generate audio-visual information related to a character, a virtual space, and a virtual object to allow the audio-visual output device included in the output unit to output the audio-visual information. Then, the control unit 33 may generate image and sound data of a first person view, a reference of which is the character.

Meanwhile, the communication unit 34 may perform wired/wireless communication with the EMS output device 1, the sensing device 2, and the audio-visual output device included in the output unit. Further, the communication unit 34 may load virtual reality information from another server. To achieve this, the communication unit 34 may include a communication module that supports at least one of various wired/wireless communication methods. For example, the communication module may be realized in the form of a chipset.

Figure 5:
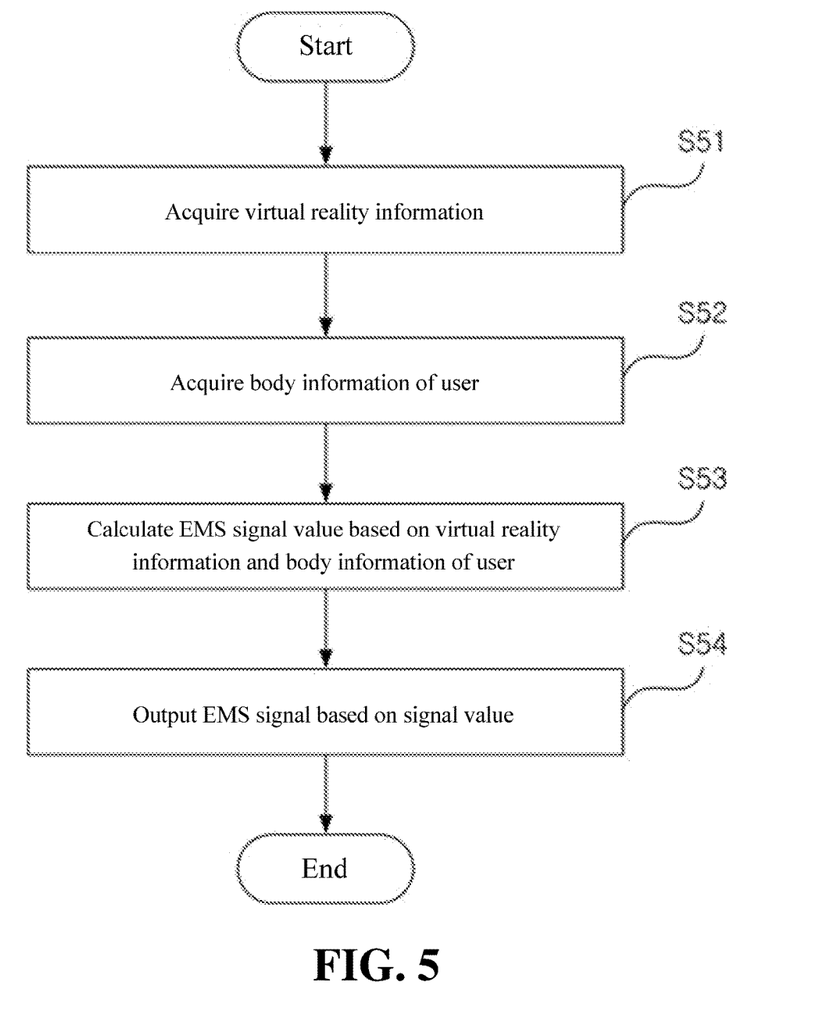
FIGS. 5 and 6 are flowcharts illustrating an EMS signal generating method according to an embodiment.
Figure 6:
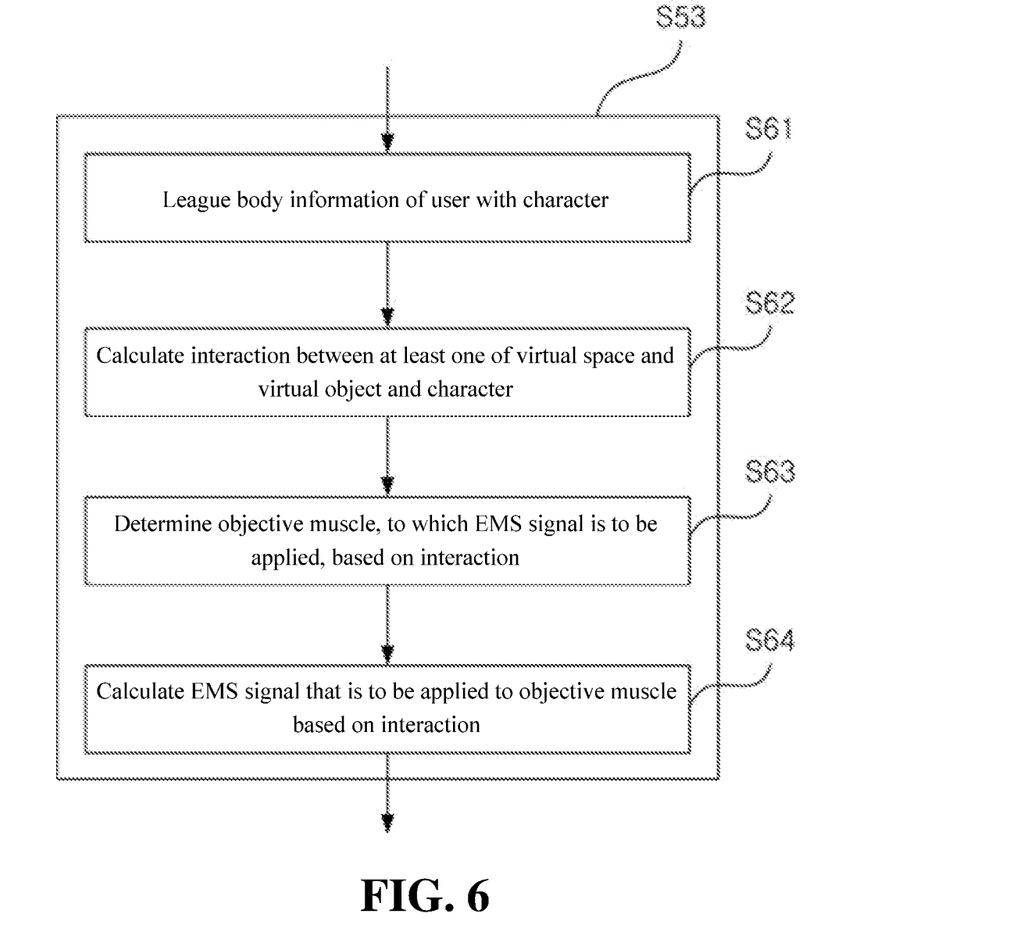

Next, FIGS. 5 and 6 are flowcharts for explaining an EMS signal generating method according to embodiments. The EMS signal generating method of FIGS. 5 and 6 according to embodiments include operations that are processed in time series by the EMS signal generating system 100 illustrated in FIG. 1. Accordingly, the contents described above about the EMS signal generating system 100 illustrated in FIG. 1 may be also applied to the EMS signal generating method of FIGS. 5 and 6 according to the embodiment even though they are omitted in the following.

Referring to FIG. 5, the EMS signal generating method 100 may acquire virtual reality information (S51), and may acquire user body information (S52). Further, the EMS signal generating system 100 may calculate an EMS signal value based on virtual reality information and user body information (S53), and may output an EMS signal based on the calculated signal value (S54).

Then, when the EMS signal generating system 100 acquires body information of the user (S52), it may acquire user body information including at least one of a posture, a location, and a motion of the user through at least one of a motion sensor and a visual sensor.

According to an embodiment, the virtual reality information may include at least one of virtual space information, virtual object information, and character information corresponding to the user.

Further, referring to FIG. 6, when the EMS signal generating system 100 calculates an EMS signal value (S53), it may league the body information of the user with the character (S61). Through this, information on a posture, a location, and a motion of the user is applied to the character in the virtual space.

Further, the EMS signal generating system 100 may calculate a mechanical interaction between at least one of the virtual space and the virtual object, and the character (S62), and may calculate an EMS signal value that is to be applied to a muscle of the user based on the calculated interaction.

Then, the EMS signal generating system 100 may determine an objective muscle, to which the EMS signal is to be applied (S63), and may calculate an EMS signal that is to be applied to the determined objective muscle (S64).

Meanwhile, the EMS signal generating system 100 may measure a time delay of the visual sensor before acquiring virtual reality information (S51). Then, when the EMS signal generating system 100 calculates an EMS signal value based on virtual reality information and body information of the user (S53), it may calculate the EMS signal value based on the body information of the user that has been calibrated based on virtual reality information and a time delay.

Figure 7:
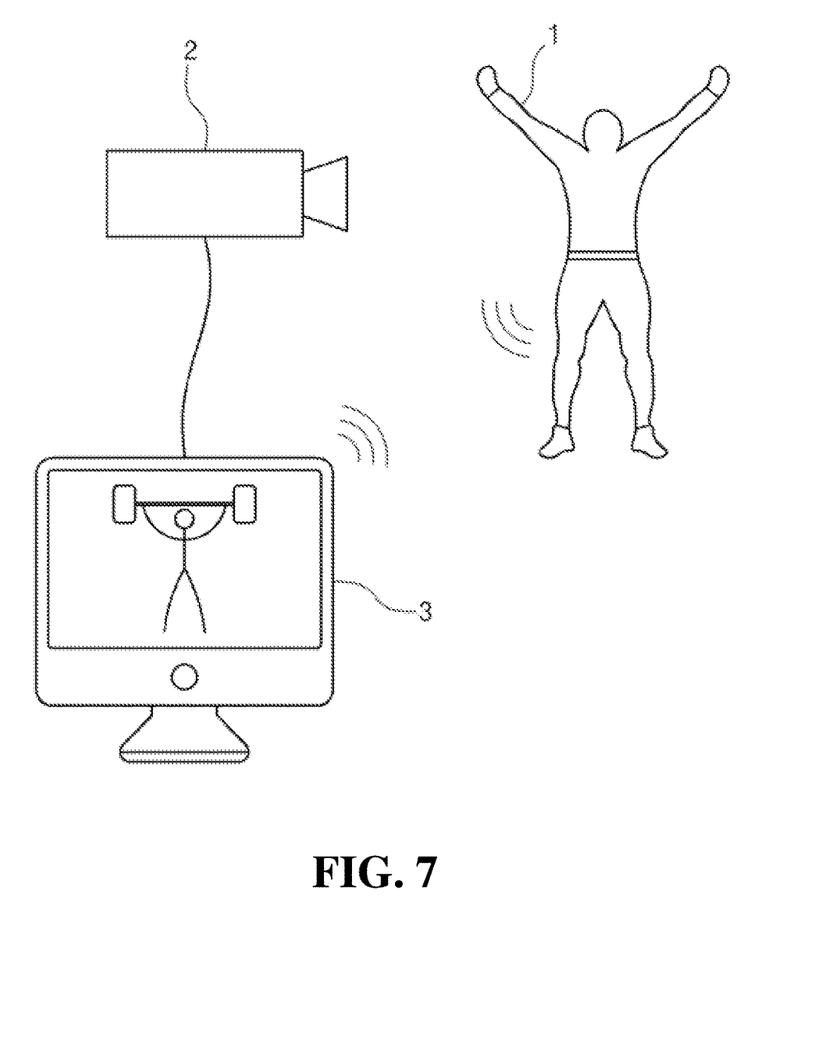
FIGS. 7 to 9 are exemplary views illustrating an embodiment of the EMS signal generating method.
Figure 8:
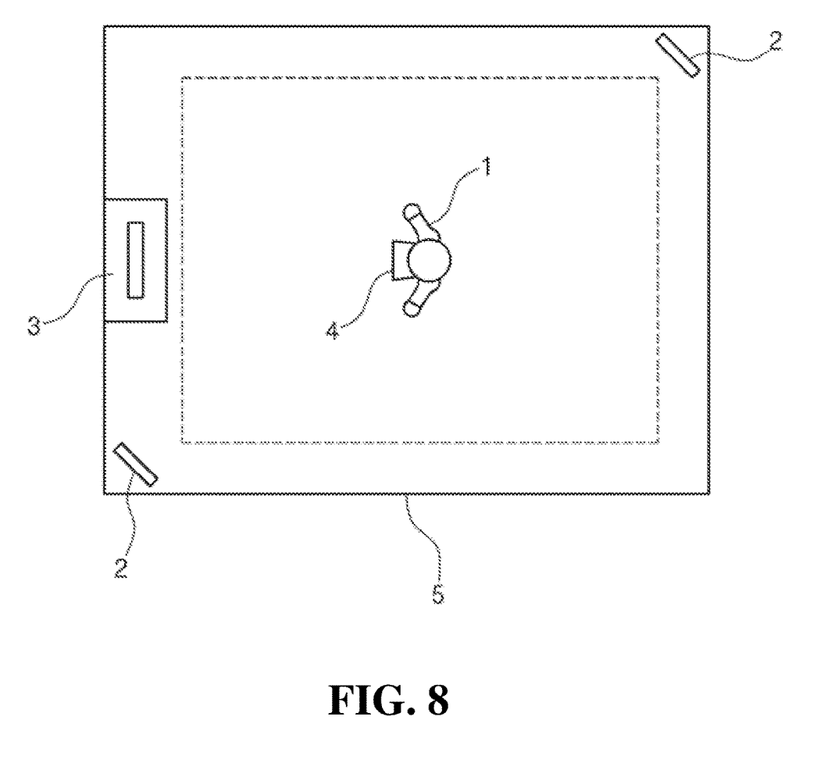
Figure 9:
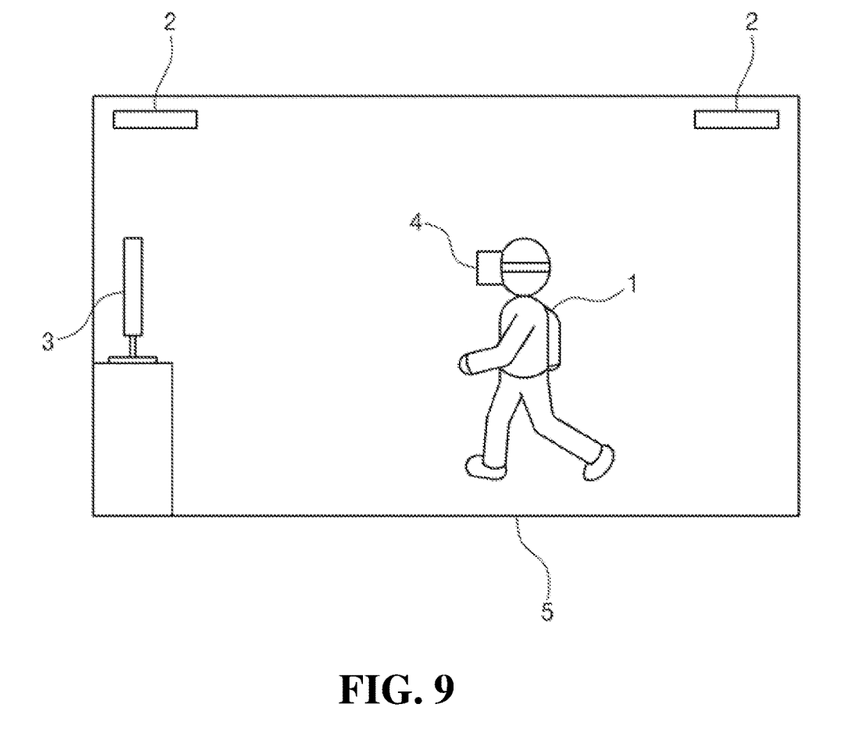

Next, referring to FIGS. 7 to 9, an embodiment of the EMS signal generating method is illustrated.

Referring to FIG. 7, an embodiment of a user who wears the EMS output device 1, the sensing device 2, and the calculation device 3 is illustrated. According to an embodiment, the EMS output device 1 and the calculation device 3 perform wireless communication and the sensing device 2 and the calculation device 3 perform wired communication.

Further, the output unit of the calculation device 3 displays the character, with which a posture, a location, and a motion of the user are leagued. That is, the user takes a posture (and a motion) of raising a weight by raising both arms, and accordingly, the character raises a weight that is a virtual object in the virtual space.

As described above, the EMS signal generating system 100 may calculate an interaction between the character, and the virtual space and the virtual object. For example, as the character raises the weight having a weight due to the influence of the gravity with both hands, the muscles of the whole body of the character receives a muscular load. Further, if wind blows in the virtual space, the character will feel a resistance of the wind. The EMS signal generating apparatus calculates an interaction between the character, and the virtual space and the virtual object, and accordingly, calculates an EMS signal value that is to be applied to a muscle of the user.

Next, referring to FIGS. 8 and 9, an appearance in which the user wears the EMS output device 1 in the reality space 5 is illustrated. The sensing device 2 is disposed in the reality space 5 to be spaced apart from the sensing device 2, and the calculation device 3 is disposed. Further, the user wears a HMD type audio-visual output device 4. In this way, as the HMD type audio-visual output device 4 and the EMS output device 1 are operated in conjunction with each other, the user may be provided with a virtual reality experience that is more realistic.

The term 'unit' used in the above embodiments refers to software or a hardware element such as a field programmable gate array or an ASIC, and the unit performs some functions. However, the 'unit' is not limited to software or hardware. The 'unit' may be constituted to be stored in a storage medium that may be addressed or may be constituted to reproduce one or more processors. Accordingly, in an embodiment, the 'unit' includes elements, such as software elements, object-oriented software elements, class elements, and task elements, processes, functions, attributes, procedures, subroutines, segments of a program patent code, drivers, firmware, a microcode, a circuit, data, a database, data structures, tables, arrays, and parameters.

The functions provided in the elements and the 'units' may be coupled to a smaller number of elements and 'units' or may be separated from additional elements and 'units'.

In addition, the elements and the 'units' may be realized to reproduce one or more CPUs in a device or a security multimedia card.

The EMS signal generating method of FIGS. 5 and 6 according to the embodiments may be realized in a form of a computer-readable medium, which stores instructions that may be executed by a computer and data. Then, the instructions and data may be stored in a form of a program code, and a program module may be generated to perform a specific operation when the instructions and data are executed by a processor. Further, the computer-readable medium may be an arbitrary available medium that may be accessed by a computer, and includes a volatile memory, a nonvolatile memory, a separable medium, and a non-separable medium. Further, the computer-readable medium may be a computer-recording medium, and the computer-recording medium may include a computer readable instruction, a data structure, a program, or volatile, nonvolatile, separable, non-separable media that are realized by a method or a technology for storing information such as data. For example, the computer-recording medium may be a magnetic storage medium such as an HDD or an SSD, an optical recording medium such as a CD, a DVD, or a blu-ray disk, and a memory included in a server that may be accessed through a network.

Further, the EMS signal generating method of FIGS. 5 and 6 according to the embodiments may be realized by a computer program (or a computer program product) including an instruction that may be executed by a computer. The computer program includes a programmable machine instruction that is executed by a processor, and may be realized by a high-level programming language, an object-oriented programming language, an assembly language, or a machine language. Further, the computer program may be recorded in a concrete computer-readable recording medium (for example, a memory, a hard disk, a magnetic/optical medium, or a solid-state drive (SSD)).

Accordingly, the EMS signal generating method of FIGS. 5 and 6 according to the embodiments may be realized as the computer program is executed by a computing device. The computing device may include at least some of a processor, a memory, a storage device, a high-speed interface that is connected to a memory and a high-speed expansion port, and a low-speed interface that is connected to a low-speed bus and a storage device. The components are connected to each other by various buses, and may be mounted on a common mother board or may be mounted in a different proper method.

Here, the processor may process an instruction in a computing device, and the instruction may include, for example, an instruction stored in a memory or a storage device to display graphic information for providing a graphic user interface (GUI) on an output device. As another embodiment, a plurality of processors and (or) a plurality of buses may be used together with a plurality of memories and memory forms properly. Further, the processor may be realized in a chip set including chips including a plurality of independent analog and (or) digital processors.

Further, the memory stores information in a computing device. As an example, the memory may include a volatile memory unit or a set of volatile memory units. As another example, the memory may include a nonvolatile memory unit or a set of nonvolatile memory units. Further, the memory may be, for example, another form of computer readable medium, such as a magnetic or optical disk.

Further, the storage device may provide a storage space of a high capacity to the computing device. The storage device may be a computer-readable medium or may include such a medium, and for example, may include devices in a storage area network (SAN) or other configurations and may be a floppy disk device, a hard disk device, an optical disk device, or a tape device, a flash memory, a semiconductor memory or a device array that are similar to the devices.

The above-mentioned embodiments are exemplary, and it will be understood by an ordinary person skilled in the art to which the embodiments pertain that the embodiments may be easily modified into other detailed forms without changing the technical spirit or essential features. Therefore, it should be noted that the above-mentioned embodiments are exemplary and not restrictive in all aspects. For example, the elements described in single forms may be distributed, and similarly, the elements described to be distributed may be carried out in coupled forms.

The scope that is protected by the specification is determined not by the detailed description but by the claims, and it should be construed that the scope includes meanings and scopes of the claims, and all changes and modifications derived from the equivalent concepts.

What is claimed is:

1. A system for generating an electrical muscle stimulation (EMS) signal, the system comprising:
a sensing device configured to acquire body information of a user;
a calculation device configured to store virtual reality information, and to calculate an EMS signal value based on the body information of the user and the virtual reality information; and
an EMS output device configured to output an EMS signal based on the EMS signal value,
wherein
the virtual reality information includes virtual space information, virtual object information, and character information corresponding to the user, and
the calculation device
calculates a mechanical interaction that has occurred between the virtual object and the character in the virtual space,
determines a target muscle and an objective muscle, based on the calculated mechanical interaction,
wherein
the objective muscle is a muscle to which the EMS signal is applied, and the target muscle is a muscle to which a force will be applied by the user in response to the application of the EMS signal to the objective muscle, as the user's reflex reaction to the application of the EMS signal, and calculates the EMS signal value based on the calculated mechanical interaction and the determined objective muscle.

2. The system of claim 1, wherein the sensing device includes at least one of a motion sensor and a visual sensor, and acquires the body information of the user including at least one of a posture, a location, and a motion of the user.

3. The system of claim 2, wherein the calculation device updates the body information of the user at a specific cycle, and the body information of the user is changed by updating information of the motion sensor at a first cycle and updating information of the visual sensor at a second cycle, and wherein the second cycle is longer than the first cycle.

4. The system of claim 1, wherein the body information of the user includes at least one of a posture, a location, and a motion of the user, and wherein the calculation device calculates the mechanical interaction between at least one of the virtual space and the virtual object, and the character, and calculates the EMS signal that is to be applied to the objective muscle based on the calculated mechanical interaction.

5. The system of claim 4, wherein the calculation device calculates the mechanical interaction between the at least one of the virtual space and the virtual object, and the character by leaguing at least one of a posture, a location, and a motion of the user with the character.

6. The system of claim 1, further comprising:

an audio-visual output device configured to output audio-visual information based on the body information of the user and the virtual reality information.

7. A method for generating an electrical muscle stimulation (EMS) signal, the method being performed by the EMS signal generating system, the method comprising:

acquiring virtual reality information;
acquiring body information of a user;
calculating an EMS signal value based on the virtual reality information and the body information of the user; and
outputting an EMS signal based on the signal value,
wherein
 the virtual reality information includes virtual space information, virtual object information, and character information corresponding to the user, and
 the calculating comprises
  calculating a mechanical interaction that has occurred between the virtual object and the character in the virtual space,
  determining a target muscle and an objective muscle, based on the calculated mechanical interaction,
  wherein
   the objective muscle is a muscle to which the EMS signal is applied, and
   the target muscle is a muscle to which a force will be applied by the user in response to the application of the EMS signal to the objective muscle, as the user's reflex reaction to the application of the EMS signal, and
  calculating the EMS signal value based on the calculated mechanical interaction and the determined objective muscle.

8. The method of claim 7, wherein the acquiring of the body information of the user includes:

acquiring the body information of the user including at least one of a posture, a location, and a motion of the user through at least one of a motion sensor and a visual sensor.

9. The method of claim 7, wherein the body information of the user includes information on at least one of a posture, a location, and a motion of the user, and wherein the calculating of the EMS signal value includes:
 calculating the mechanical interaction between at least one of the virtual space and the virtual object, and the character, and
 calculating the EMS signal value that is to be applied to the objective muscle based on the calculated mechanical interaction.

10. The method of claim 9, wherein the calculating of the mechanical interaction includes:

leaguing the body information of the user with the character; and
calculating the mechanical interaction between the at least one of the virtual space and the virtual object, and the character, based on the leagued body information.

11. A non-transitory computer-readable recording medium in which a program that performs the following process of:

acquiring virtual reality information,
acquiring body information of a user,
calculating an EMS signal value based on the virtual reality information and the body information of the user; and
outputting an EMS signal based on the signal value,
wherein
 the virtual reality information includes virtual space information, virtual object information, and character information corresponding to the user, and
 the calculating comprises
  calculating a mechanical interaction that has occurred between the virtual object and the character in the virtual space,
  determining a target muscle and an objective muscle, based on the calculated
  wherein
   the objective muscle is a muscle to which the EMS signal is applied, and
   the target muscle is a muscle to which a force will be applied by the user in response to the application of the EMS signal to the objective muscle, as the user's reflex reaction to the application of the EMS signal, and
  calculating the EMS signal value based on the calculated mechanical interaction and the determined objective muscle.

* * * * *